US009952665B2

(12) United States Patent
Di Censo et al.

(10) Patent No.: US 9,952,665 B2
(45) Date of Patent: Apr. 24, 2018

(54) EYE VERGENCE DETECTION ON A DISPLAY

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stanford, CT (US)

( * ) Notice: Subject to any disclaimer, the term of this patent is extended or adjusted under 35 U.S.C. 154(b) by 74 days.

(21) Appl. No.: 14/587,824

(22) Filed: Dec. 31, 2014

(65) Prior Publication Data

US 2015/0192992 A1    Jul. 9, 2015

Related U.S. Application Data

(60) Provisional application No. 61/923,567, filed on Jan. 3, 2014.

(51) Int. Cl.
*G09G 5/00*  (2006.01)
*G06F 3/01*  (2006.01)
(Continued)

(52) U.S. Cl.
CPC ............ *G06F 3/013* (2013.01); *G02B 27/01* (2013.01); *G02B 27/0093* (2013.01);
(Continued)

(58) Field of Classification Search
CPC ..... G06F 3/013; G02B 27/01; G02B 27/0093; G02B 2027/0187; G02B 2027/0185; G02B 2027/014
See application file for complete search history.

(56) References Cited

U.S. PATENT DOCUMENTS

| 6,426,740 B1 * | 7/2002 | Goto ........................ A61F 4/00 345/157 |
| 2006/0066567 A1 * | 3/2006 | Scharenbroch ........ G02B 27/01 345/156 |

(Continued)

FOREIGN PATENT DOCUMENTS

DE    102012006966 A1    11/2012

OTHER PUBLICATIONS

Extended European Search Report for Application No. 15150022.0 dated May 12, 2015.

(Continued)

*Primary Examiner* — Ilana Spar
*Assistant Examiner* — Brent D Castiaux
(74) *Attorney, Agent, or Firm* — Artegis Law Group, LLP

(57) ABSTRACT

One embodiment of the present invention sets forth technique for displaying an image based on eye vergence. The technique includes determining a first distance from one or more eyes of a user to a display location, and determining, based on eye gaze vectors associated with the eyes of the user, an eye convergence distance. The technique further includes causing the image to be displayed when the eye convergence distance is substantially the same as the first distance, or causing a display of the image to be terminated when the eye convergence distance is not substantially the same as the first distance.

26 Claims, 7 Drawing Sheets

(51) Int. Cl.
  *G02B 27/01* (2006.01)
  *G02B 27/00* (2006.01)
(52) U.S. Cl.
  CPC .............. *G02B 2027/014* (2013.01); *G02B 2027/0185* (2013.01); *G02B 2027/0187* (2013.01)

(56) References Cited

U.S. PATENT DOCUMENTS

2010/0253526 A1* 10/2010 Szczerba .............. B60K 28/066
  340/576
2012/0215403 A1* 8/2012 Tengler ................ B60W 50/12
  701/36
2012/0250152 A1* 10/2012 Larson ............... G02B 27/2264
  359/464

OTHER PUBLICATIONS

Wang et al., "Gaze determination via images of irises", Image and Vision Computing, vol. 19, No. 12, 2001, pp. 891-191.

* cited by examiner

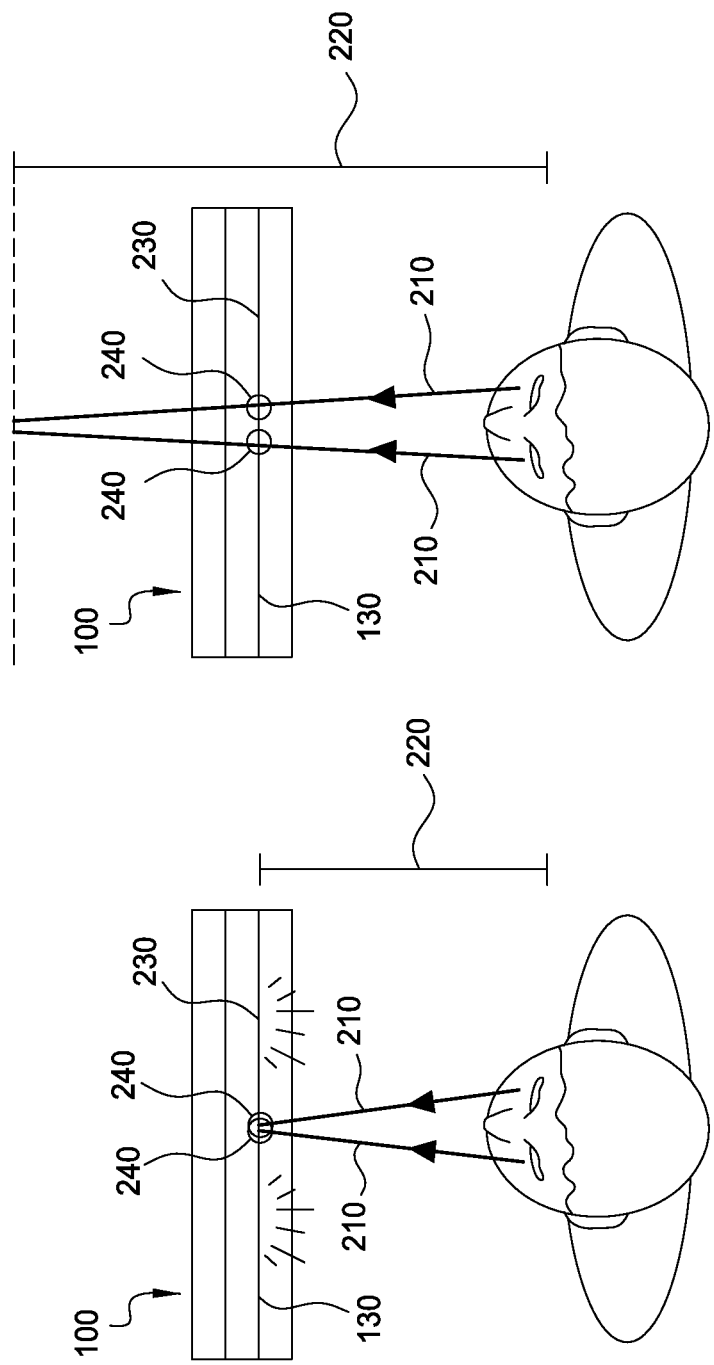

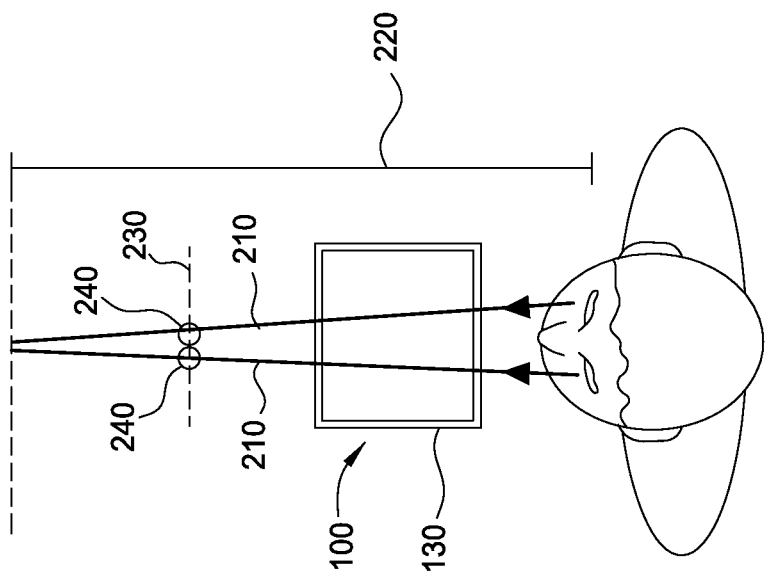
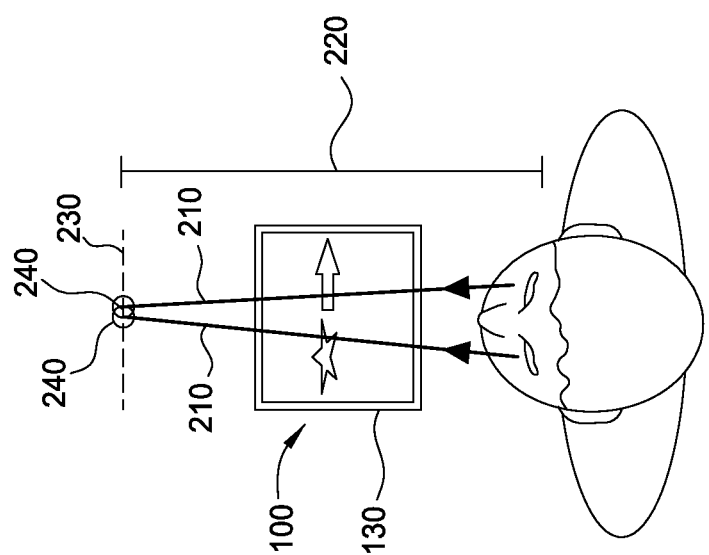

$$D_{eye} = (d/2 * \sin \alpha') / \sin(\varepsilon'/2)$$

EYE VERGENCE DETECTION ON A DISPLAY

CROSS-REFERENCE TO RELATED APPLICATIONS

This application claims benefit of the U.S. provisional patent application having Ser. No. 61/923,567, filed Jan. 3, 2014. The subject matter of this related application is hereby incorporated herein by reference.

BACKGROUND

Field of the Embodiments of the Invention

Embodiments of the present invention generally relate to graphical user interfaces and, more specifically, to eye vergence detection on a display.

Description of the Related Art

Technological advancements within the electronics industry have increased the prevalence of various types of graphical user interfaces (GUIs) in nearly all aspects of daily life. In many countries, the majority of people now carry at least one of a personal computer, smartphone, smart watch, etc. that provide convenient access to different types of information. In addition, many vehicles provide a GUI (e.g., on a center console display, an electronic instrument cluster display, a head-up display, and/or navigation system display) that provides vehicle statistics, route guidance, media information, and the like.

GUIs displayed by conventional electronic devices, such as the devices described above, typically strive to fit specific use cases in order to enable users to stay "connected" in certain settings with minimal distraction. However, because most electronic devices require the user to avert his or her eyes from the surrounding environment (e.g., in order to look at a display screen), such devices still provide an unacceptable level of distraction for certain use cases. For example, vehicle GUIs that are provided via a center-console navigation screen and/or dashboard display require a user to look away from the road, thereby increasing the risk of distracted driving. Further, although certain display technologies, such as a heads-up display (HUD), enable the user to maintain his or her vision in a desired direction (e.g., towards the road), the images generated by such displays obscure portions of the user's vision. Accordingly, GUIs displayed by conventional electronic device are poorly suited for use while a person is driving and in other similar situations.

As the foregoing illustrates, one or more techniques that enable a user to more effectively view and interact with images generated by a display while the user is driving would be useful.

SUMMARY

One embodiment of the present invention sets forth a method for displaying an image based on eye vergence. The method includes determining a first distance from one or more eyes of a user to a display location, and determining, based on eye gaze vectors associated with the eyes of the user, an eye convergence distance. The method further includes causing the image to be displayed when the eye convergence distance is substantially the same as the first distance, or causing a display of the image to be terminated when the eye convergence distance is not substantially the same as the first distance.

Further embodiments provide, among other things, a system and a non-transitory computer-readable medium configured to implement the method set forth above.

At least one advantage of the various embodiments is that a user is able to cause an image to be displayed or hidden based on whether the user is focusing his or her eyes on a display. Additionally, an image may be displayed via a transparent display and/or heads-up display (HUD), enabling the user to hide the image and then view the surrounding environment behind the image without changing his or her viewing direction.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A and 2B illustrate a technique for operating the eye vergence detection system of FIG. 1A in conjunction with a transparent display, according to various embodiments;

FIGS. 3A and 3B illustrate a technique for operating the eye vergence detection system of FIG. 1A in conjunction with a heads-up display (HUD), according to various embodiments;

DETAILED DESCRIPTION

In the following description, numerous specific details are set forth to provide a more thorough understanding of the embodiments. However, it will be apparent to one of skill in the art that the embodiments may be practiced without one or more of these specific details.

Figure 1A:
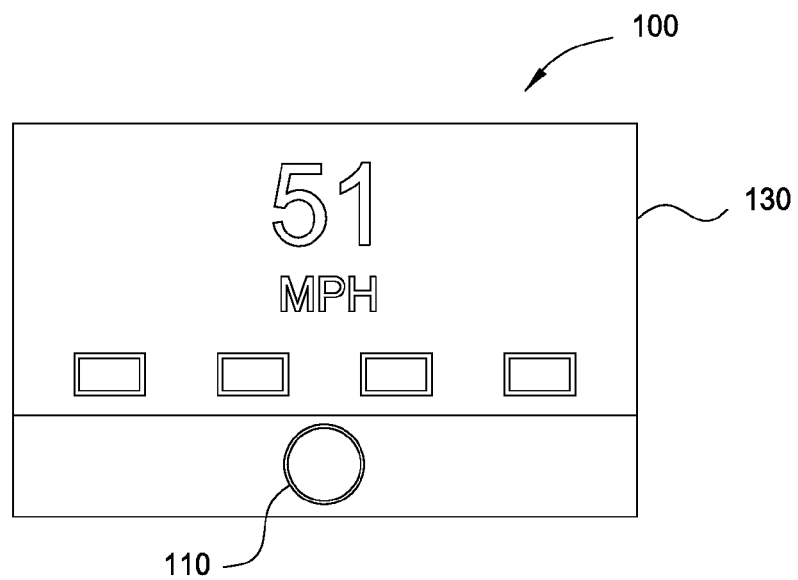
FIG. 1A illustrates an eye vergence detection system for determining eye vectors and modifying a display, according to various embodiments.

FIG. 1A illustrates an eye vergence detection system 100 for determining eye vectors and modifying a display 130, according to various embodiments. As shown, the eye vergence detection system 100 may include, without limitation, one or more sensors 110 and a display 130. The sensors 110 are configured to acquire images of a user and/or determine the position of the user. Images acquired by the one or more sensors 110 may be analyzed by a computing device 120 included in the eye vergence detection system 100 and/or a computing device 120 that is separate from the eye vergence detection system 100. The display 130 is configured to display one or more images to a user, such as a graphical user interface (GUI), media content, vehicle statistics, and/or other types of information.

Figure 1B:
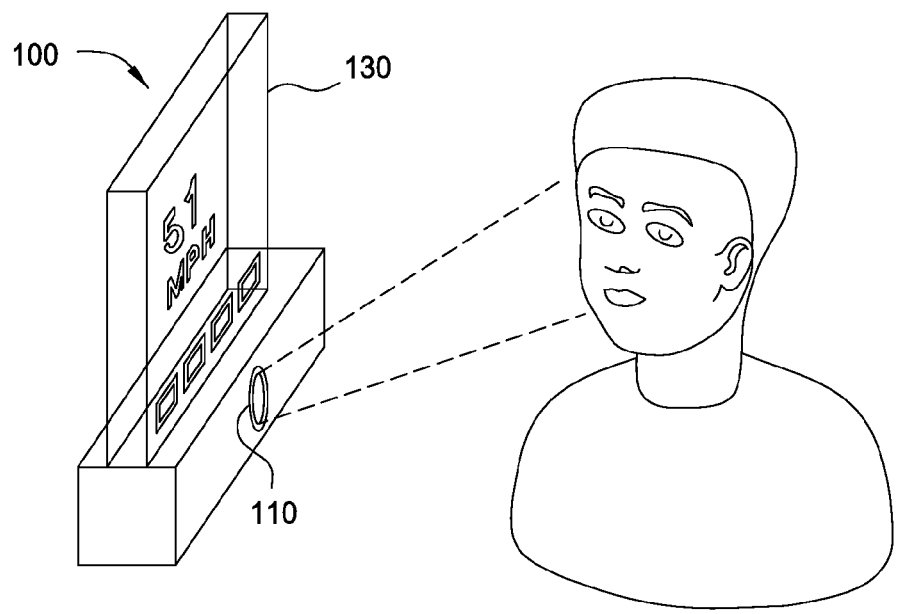
FIG. 1B illustrates a user interacting with the eye vergence detection system of FIG. 1A in order to cause an image to be displayed or hidden, according to various embodiments.

In various embodiments, the sensors 110 include one or more cameras that are configured to acquire images of a user's eyes, as shown in FIG. 1B, which illustrates a user interacting with the eye vergence detection system 100 of FIG. 1A in order to cause an image to be displayed or hidden, according to various embodiments. The image(s) are then analyzed to determine eye position(s), eye vergence angle(s), two-dimensional (2D) eye vectors, three-dimensional (3D) eye vectors, interocular distance, and/or the distance at which the eyes converge. In some embodiments, images of the user's eyes are processed using pupil center corneal reflection eye tracking techniques, such as those implemented in the "Eye Trackers" produced by TOBII TECHNOLOGY™ (Karlsrovagen 2D, Danderyd 18253, Sweden, SE556613965401). However, images may be acquired and processed via any useful imaging technique, including, without limitation, visible light techniques and infrared light techniques.

In some embodiments, the eye vergence detection system 100 includes two (or more) cameras, each of which is configured to track one or both of the eyes of a user. Further, additional sensors 110 (e.g., light sensors, image sensors, depth sensors, etc.) may be included in the eye vergence detection system 100 to measure the distance from the user to the eye vergence detection system 100, the distance of various objects and display locations (e.g., a surface of display 130 and/or a virtual image location) from the eye vergence detection system 100, and the like. Additionally, in some embodiments, at least a portion of the eye vergence detection system 100 (e.g., one or more sensors 110) is worn by the user. For example, and without limitation, the eye vergence detection system 100 could be a headset or pair of glasses worn by the user. In such embodiments, a sensor 110 could be positioned in the eye vergence detection system 100 proximate to the eyes of the user, such as in a headset or pair of glasses near each eye of the user.

The display 130 may include a transparent display (e.g., an organic light-emitting diode (OLED) display, liquid crystal display (LCD), etc.), a heads-up display (HUD) (e.g., a reflective display, volumetric display, etc.), or any other type of device that enables a user to view display images and also see through at least a portion of the display 130 to view the surrounding environment. In some embodiments, the display 130 is positioned in front of the user, such as in or on top of a car dashboard or windshield, or is a head-mounted display (HMD), such as a display 130 that is coupled to a pair of glasses. In other embodiments, the display 130 includes a projector that projects a display image towards a display location, such as a reflective surface, at which the user perceives the display image. Accordingly, in such embodiments, the display 130 and the display location may be at separate locations.

As described above, conventional transparent displays and HUDs are unable to detect whether a user is focusing on a display location (e.g., a display surface or virtual image location) or merely looking towards the display location. Accordingly, conventional displays commonly display information at times when the information is obtrusive, extraneous, or otherwise unwanted by the user. Further, in many cases, such as when a user is driving, displaying unwanted information to a user may interfere with the user's ability to view and interact with his or her surroundings. For example, and without limitation, with reference to FIG. 2B, although the user's head and eyes are facing towards the display 130, the eyes of the user may be looking through the display 130 and attempting to focus on the surrounding environment (e.g., a roadway or surrounding vehicles). Consequently, displaying an image on the display 130 may distract the user.

Under such circumstances, the eye vergence detection system 100 is used to determine that the eyes of the user are not focusing on the display location, but are instead focusing through the display location. Then, upon determining that the eyes of the user are not focusing on the display location, the eye vergence detection system 100 causes at least a portion of the images displayed by the display 130 to be hidden, enabling the user to see through the display 130 and more effectively view his or her surroundings.

In various embodiments, the sensors 110 include a depth sensor that determines a distance from the eyes of the user to a display location at which an image is being displayed (e.g., a surface of the display 130 or a virtual image location associated with a HUD). The eye vergence detection system 100 then acquires one or more images of the eyes of the user and analyzes the images to determine the distance and/or location at which the eyes converge. The distance from the eyes to the display location is then compared to the eye convergence distance to determine whether the eyes are focusing on the display location. If the eyes of the user are not focusing on the display location, then the eye vergence detection system 100 causes one or more images to be hidden from the display 130. If, on the other hand, the eyes of the user are focusing on the display location, then the eye vergence detection system 100 causes one or more images to be displayed or redisplayed by the display 130.

The depth sensor(s) may be positioned in a variety of locations relative to the location of the eyes of the user. For example, although FIGS. 1A and 1B depict the depth sensor as being coupled to the eye vergence detection system 100 and positioned in front of the user, the depth sensor(s) may be located in other positions, such as on the hood of a vehicle, in the interior of a vehicle, or on the exterior of a vehicle. Moreover, when a depth sensor is located in the interior of the vehicle, the depth sensor may be located in front of the driver, behind the driver, or next to the driver. In various embodiments, a depth sensor is positioned at a location that is near, or in line with, the eyes of the user.

FIGS. 2A and 2B illustrate a technique for operating the eye vergence detection system 100 of FIG. 1A in conjunction with a transparent display, according to various embodiments. As described above, in some embodiments, the display 130 is a transparent display through which a user can view his or her surroundings. In operation, the eye vergence detection system 100 tracks, via one or more sensors 110, a left eye vector 210 and/or right eye vector 210 of the user to determine an eye convergence distance 220. The eye vergence detection system 100 further tracks (e.g., via a depth sensor) the distance from the eyes of the user to the display location 230 (e.g., a surface on which images are displayed, in FIGS. 2A and 2B). The eye vergence detection system 100 then compares the eye convergence distance 220 to the distance from the eyes of the user to the display location 230.

If the eye convergence distance 220 is substantially the same as the distance from the eyes of the user to the display location 230, as shown in FIG. 2A, then the eye vergence detection system 100 causes one or more images to be displayed or redisplayed by the display 130. If the eye convergence distance 220 is not substantially the same as the distance from the eyes of the user to the display location 230, as shown in FIG. 2B, then the eye vergence detection system 100 causes one or more images to be hidden from the display 130. For example, and without limitation, the display of one or more images could be terminated by the eye vergence detection system 100 in response to determining that the eye convergence distance 220 is substantially greater than the distance from the eyes of the user to the display location 230. In such circumstances, the eye vergence detection system 100 could determine that the user is focusing through the display 130 (e.g., on an object on the other side of the display 130) and, consequently, that one or more images should not be displayed on the display 130.

In some embodiments, the eye convergence distance 220 is determined by detecting the location of an intersection point 240 associated with each eye vector 210. As shown in FIGS. 2A and 2B, once the eye vectors 210 are determined, intersection of the eye vectors 210 with a display location, such as the plane or surface of the display 130, may be determined. Then, the location at which the eyes converge may be detected by determining the location at which the intersection points 240 are proximate to one another. For example, and without limitation, in FIG. 2A, the intersection points 240 of the eye vectors 210 with the display location 230 (e.g., a surface of the display 130 on which an image is shown) are nearby one another, indicating that the user is focusing on the display location 230. By contrast, in FIG. 2B, the intersection points 240 of the eye vectors 210 with the display location 230 are not proximate to one another, indicating that the user is focusing through the display location 230 towards an object that is located behind the display location 230. Accordingly, in some embodiments, the eye vergence detection system 100 may determine that the eye convergence distance 220 is substantially the same as the distance from the eyes of the user to the display location 230 based on the intersection points 240 of the eye vectors 210 with the display location 230.

In some embodiments, the eye vergence detection system 100 may determine whether the eyes of the user are focusing on a display location 230 (e.g., whether the eyes of the user converge on the display location 230) without determining the eye convergence distance 220 or the distance from the eyes of the user to the display location 230. Instead, the eye vergence detection system 100 may determine a first location at which a left eye gaze vector of a user intersects a plane associated with the display location 230 and a second location at which a right eye gaze vector of the user intersects the plane associated with the display location 230. If the first location and the second location are substantially the same or proximate to one another, then the eye vergence detection system 100 may determine that the eyes of the user are focusing on the display location 230. If the first location and the second location are not proximate to one another, then the eye vergence detection system 100 may determine that the eyes of the user are not focusing on the display location 230. In general, the left eye gaze vector and the right eye gaze vector may be determined based on any of the techniques described herein, such as by computing one or more corneal reflection images associated with the eyes of the user. Advantageously, in such embodiments, the eye vergence detection system 100 could track eye gaze vectors of the user and would not need to determine the eye convergence distance 220 or the distance from the eyes of the user to the display location 230.

FIGS. 3A and 3B illustrate a technique for operating the eye vergence detection system 100 of FIG. 1A in conjunction with a heads-up display (HUD), according to various embodiments. As described above, in some embodiments, the display 130 includes an HUD that projects an image towards the user and/or onto the surrounding environment. In such embodiments, the eye vergence detection system 100 tracks the eye vectors 210 and position of the user to determine the eye convergence distance 220 and the distance from the eyes of the user to the display location 230 (e.g., a virtual image location on which images are displayed by the HUD). The eye vergence detection system 100 then compares the eye convergence distance 220 to the distance from the eyes of the user to the display location 230.

If the eye convergence distance 220 is substantially the same as the distance from the eyes of the user to the display location 230, as shown in FIG. 3A, then the eye vergence detection system 100 causes one or more images to be displayed or redisplayed by the display 130. If the eye convergence distance 220 is not substantially the same as the distance from the eyes of the user to the display location 230, as shown in FIG. 3B, then the eye vergence detection system 100 causes one or more images to be hidden from the display 130. Additionally, the eye convergence distance 220 may be determined by detecting the locations of the intersection points 240 associated with the eye vectors 210, as described above.

In contrast to some types of transparent displays, some types of HUDs generate images that the user perceives to be located at a display location 230 that does not coincide with the physical location of the HUD hardware. For example, and without limitation, as shown in FIGS. 3A and 3B, the display location 230 at which a user must focus his or her eyes to view an image projected by the HUD could be separated from the HUD hardware by a certain distance. Further, in some embodiments, the display location 230 includes an area or volume within which a user would focus his or her eyes in order to view an image generated by the HUD. That is, in some embodiments, in order to determine whether a user is focusing on an image generated by a HUD, the eye vergence detection system 100 may determine whether the location at which the eyes of the user are converging falls within an area or volume that corresponds to the display location 230. Accordingly, in such embodiments, the eye vergence detection system 100 may determine whether to display or hide an image by determining whether the eye convergence distance 220 falls within a specified range associated with the distance from the eyes of the user to the bounds of the display location 230.

In general, the degree to which a user must focus his or her eyes in front of or behind a display location 230 in order to cause an image to be hidden depends on the sensitivity of the eye vergence detection system 100. For example, and without limitation, if high-accuracy sensors are implemented with the eye vergence detection system 100, then the eye vectors 210, eye convergence distance 220, and/or distance from the eyes for the display location 230 may be more accurately determined. Consequently, the eye vergence detection system 100 would be able to accurately determine that a user is no longer focusing on the display location 230 when the eye convergence distance 220 is only six inches greater than or less than the distance from the eyes to the display location 230. By contrast, if the sensors implemented with the eye vergence detection system 100 are of poor accuracy or moderate accuracy, then the eye vergence detection system 100 would be unable to accurately determine that a user is no longer focusing on the display location 230 unless the eye convergence distance 220 is much greater than or much less than (e.g., one or two feet greater than or less than) the distance from the eyes to the display location 230. Accordingly, in various embodiments, the degree to which the eye convergence distance 220 must differ from the distance from the eyes of the user to the display location 230 in order to cause an image to be hidden depends upon how accurately the sensor(s) 110 can determine the eye convergence distance 220 and the distance from the eyes of the user to the display location 230. In general, however, the eye vergence detection system 100 may determine that these distances are substantially the same when the distances differ by approximately five percent or less, or, in lower accuracy embodiments, when the distances differ by approximately ten percent or less.

Figure 4:
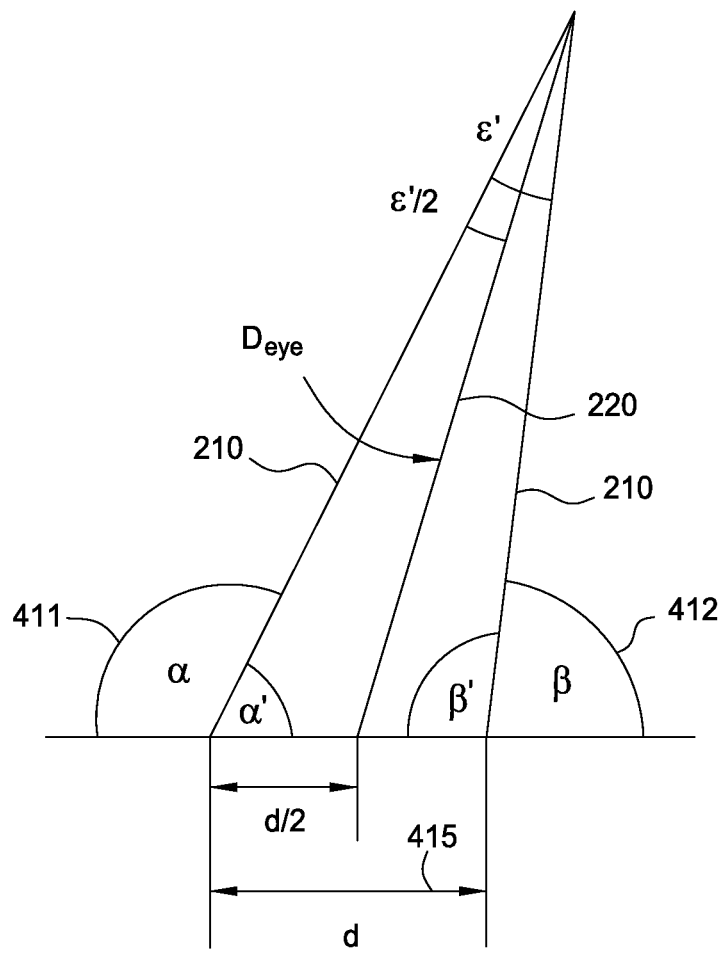
FIG. 4 is a conceptual diagram illustrating a technique for determining an eye convergence distance, according to various embodiments.

FIG. 4 is a conceptual diagram illustrating a technique for determining an eye convergence distance 220, according to various embodiments. As shown, a vergence angle 411, 412 may be determined for each eye vector 210. The vergence angles 411, 412 and the interocular distance 415 associated with the eyes of the user are then used to determine the eye convergence distance 220 ($D_{eye}$) via Equation 1, reproduced below, where α is the eye vergence angle of the left eye of the user, β is the eye vergence angle of the right eye of the user, d is the intraocular distance, α' is the supplementary angle to α, β' is the supplementary angle to β, ε' is equal to (180−α'−β'), and $D_{eye}$ is equal to [(d/2*sin α')/sin (ε'/2)]. In other embodiments, other equations or algorithms, lookups tables, and the like may be used to determine eye convergence distance 220.

$$D_{eye}=(d/2*\sin\alpha')/\sin((180-\alpha'-\beta')/2) \quad \text{(Eq. 1)}$$

Figure 5A:
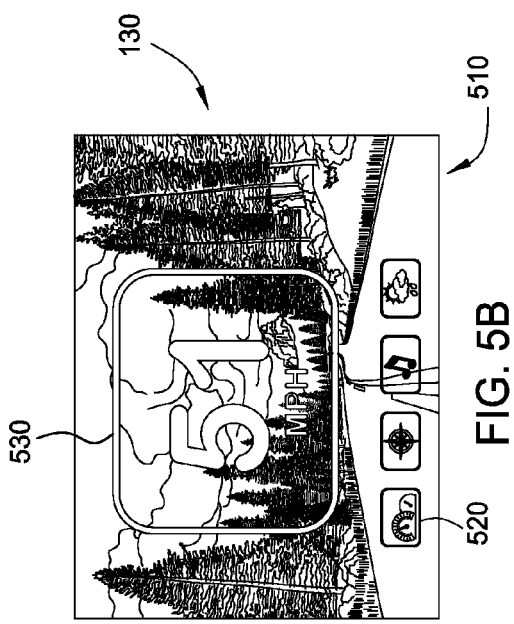
FIGS. 5A-5D illustrate a technique for implementing a graphical user interface (GUI) with the eye vergence detection system of FIG. 1A, according to various embodiments.
Figure 5B:
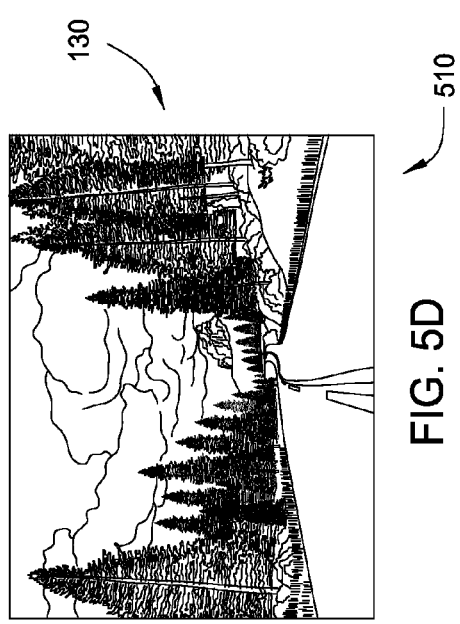

FIGS. 5A-5D illustrate a technique for implementing a graphical user interface (GUI) 510 with the eye vergence detection system 100 of FIG. 1A, according to various embodiments. As shown, when the eyes of a user focus on a display location 230, one or more images, such as a GUI 510, may be displayed via display 130. In some embodiments, the GUI 510 includes a primary display region 530 and a secondary display region that may include icons 520. The icons 520 may be selected by the user (e.g., by the user focusing his or her eyes on an icon 520) in order to modify the information displayed in the primary display region 530. For example, and without limitation, when the eye vergence detection system 100 determines that the eyes of the user are focused on a speedometer icon 520 (e.g., by determining that the eyes converge on the icon 520 using any of the eye vergence techniques described herein), the speed of a vehicle could be displayed in the primary display region 530, as shown in FIG. 5B. In addition, the user could focus on navigation, music, and/or weather icons in order to cause the eye vergence detection system 100 to display route guidance, media information, and/or a weather forecast, respectively, in the primary display region 530.

Figure 5C:
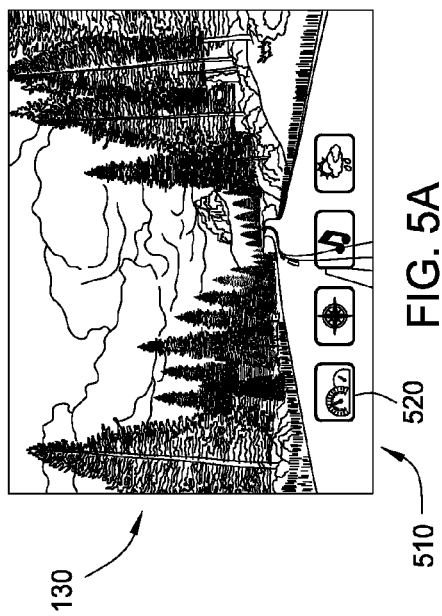
Figure 5D:
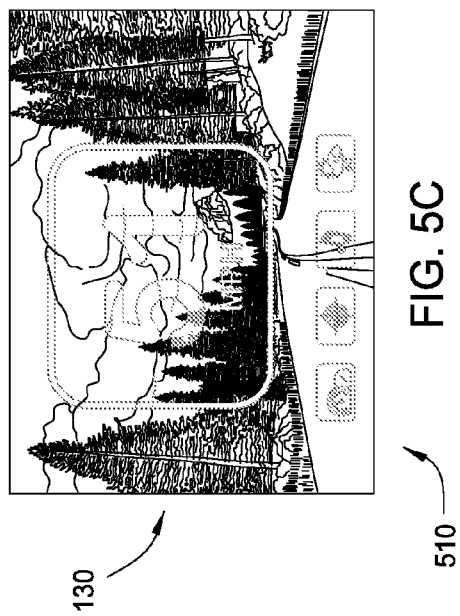

Further, when the eye vergence detection system 100 determines that the user is no longer focusing on the display location 230 (e.g., based on an eye convergence distance 220, a distance from the eyes to the display location 230, and/or intersection points 240), then the icons 520 and/or images generated in the primary display region 530 may be hidden, as shown in FIGS. 5C and 5D.

In some embodiments, in order to enable a user to more easily focus on a display location 230 to cause an image to be displayed or redisplayed, one or more images (e.g., icons 520) may remain on the display 130, even when the user is not focusing on the display location 230. That is, it may be difficult for a user to focus his or her eyes on a transparent display panel and/or other display location 230 at which little or no information is being displayed, particularly in the dark (e.g., night time) and high-contrast settings (e.g., sunset). Accordingly, when a transparent display and/or HUD hides one or more images from the display 130, a secondary portion of the display 130 may remain illuminated. For example, and without limitation, with reference to FIG. 5B, the icons 520 could remain on the display 130 when the primary display region 530 is hidden in order to allow a user to more easily focus his or her eyes on the display location 230 and, thus, cause an image to be displayed or redisplayed in the primary display region 530.

Figure 6:
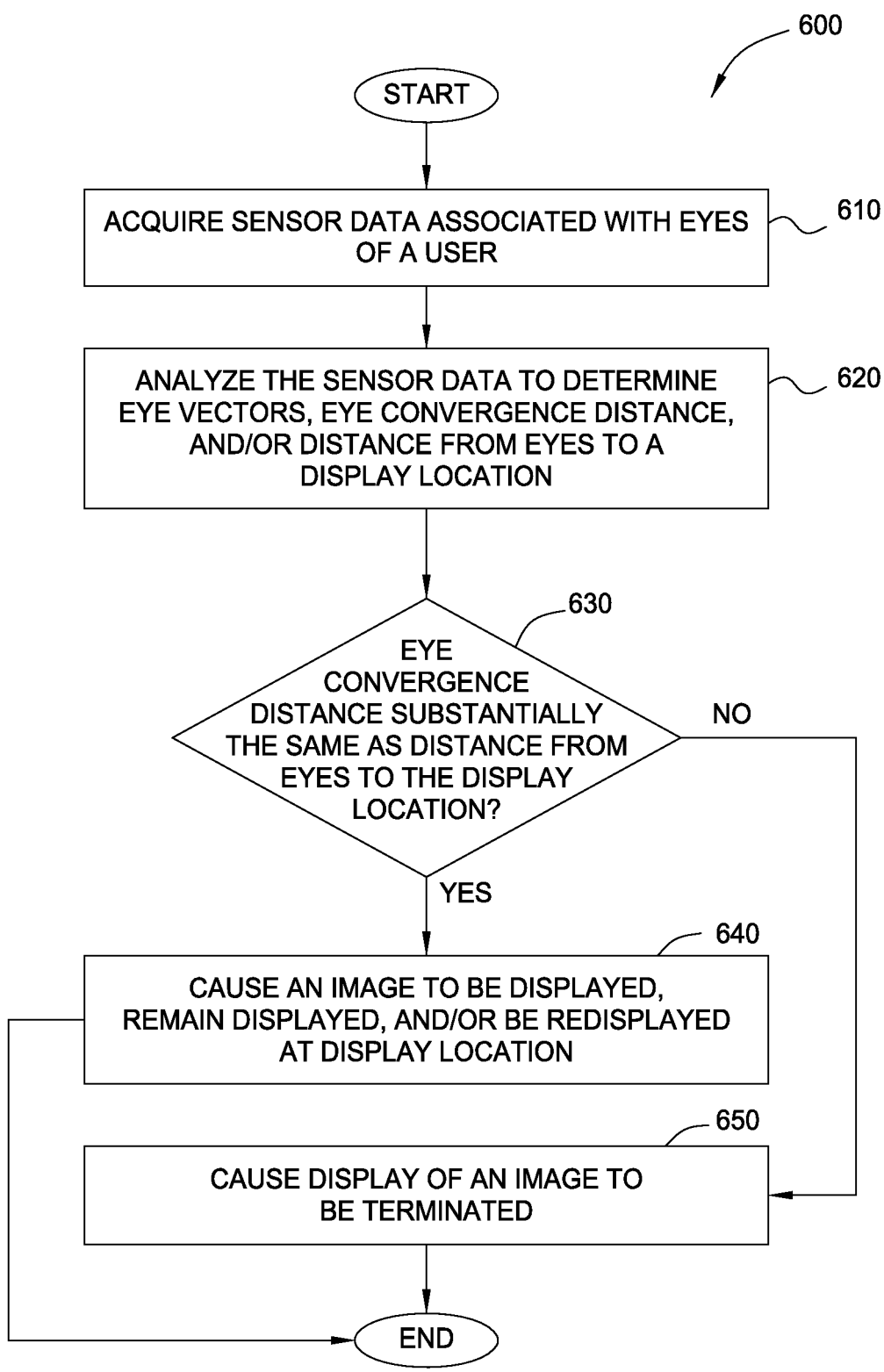
FIG. 6 is a flow diagram of method steps for displaying an image based on eye vergence detection, according to various embodiments, according to various embodiments.

FIG. 6 is a flow diagram of method steps for displaying an image based on eye vergence detection, according to various embodiments, according to various embodiments. Although the method steps are described in conjunction with the systems of FIGS. 1A-5D, persons skilled in the art will understand that any system configured to perform the method steps, in any order, falls within the scope of the present invention.

As shown, a method 600 begins at step 610, where the eye vergence detection system 100 acquires sensor data (e.g., images, depth data, etc.) associated with eyes of a user via one or more sensors 110. At step 620, the eye vergence detection system 100 analyzes the sensor data to determine one or more eye vectors 210, an eye convergence distance 220, and/or a distance from the eyes of the user to a display location 230.

Next, at step 630, the eye vergence detection system 100 compares the eye convergence distance 220 to the distance from the eyes of the user to the display location 230 to determine whether the eye convergence distance 220 is substantially the same as the distance from the eyes to the display location 230. If the eye convergence distance 220 is substantially the same as the distance from the eyes to the display location 230, then the method 600 proceeds to step 640, where the eye vergence detection system 100 causes an image to be displayed or redisplayed via the display 130. In some embodiments, at step 640, the eye vergence detection system 100 causes an image that is already being displayed to remain displayed on the display 130. The method 600 then ends.

If the eye convergence distance 220 is not substantially the same as the distance from the eyes to the display location 230, then the method 600 proceeds to step 650, where the eye vergence detection system 100 causes an image to be hidden from the display 130. The method 600 then ends.

Figure 7:
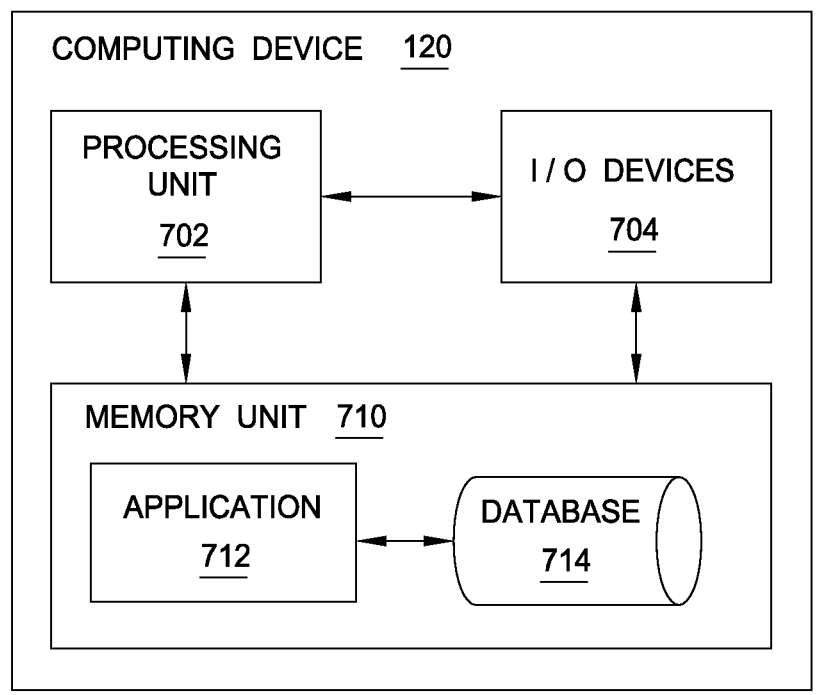
FIG. 7 is a block diagram of a computing device that may be implemented in conjunction with the eye vergence detection system of FIG. 1A, according to various embodiments.

FIG. 7 is a block diagram of a computing device 120 that may be implemented in conjunction with the eye vergence detection system 100 of FIG. 1A, according to various embodiments. As shown, computing device 120 includes a processing unit 702, input/output (I/O) devices 704, and a memory unit 710. Memory unit 710 includes an application 712 configured to interact with a database 714.

Processing unit 702 may include a central processing unit (CPU), digital signal processing unit (DSP), and so forth. I/O devices 704 may include input devices, output devices, and devices capable of both receiving input and providing output. Memory unit 710 may include a memory module or a collection of memory modules. Software application 712 within memory unit 710 may be executed by processing unit 702 to implement the overall functionality of computing device 120, and, thus, to coordinate the operation of the eye vergence detection system 100, sensors 110, and/or display 130 as a whole. The database 714 may store image data, GUIs, interocular distances, object locations, object distances, lookup tables, and other data for computing and comparing eye convergence distances 220 to other types of distances.

Computing device 120 may be coupled to one or more sensors 110, such as one or more cameras and/or depth sensors. The sensors 110 are configured to measure various properties of the environment within which user resides, as well as various properties associated with user (e.g., orientation, eye vergence angles, eye gaze direction, eye distance to a display location). The sensors 110 may include any number of cameras, depth sensors, light sensors, electrical field detectors, compasses, gyroscopes, radio transceivers, global positioning system (GPS) receivers, or any other type of sensor. Generally, the sensors 110 capture sensory data associated with the environment and sensory data associated with user, and provides that data to computing device 120.

Computing device 120 as a whole may be a microprocessor, an application-specific integrated circuit (ASIC), a system-on-a-chip (SoC), a mobile computing device such as a tablet computer or cell phone, a media player, and so forth. Generally, computing device 120 is configured to coordinate the overall operation of the eye vergence detection system 100 and/or sensors 110. Any technically feasible system configured to implement the functionality of the eye vergence detection system 100 and/or sensors 110 falls within the scope of the present invention.

In sum, the eye vergence detection system determines an eye convergence distance and a distance from the eyes of a user to a display location. The eye vergence detection system then compares the eye convergence distance to the distance from the eyes of the user to the display location to determine whether the user is focusing on the display location. If the user is focusing on the display location, then the eye vergence detection system causes an image to be displayed via a display. If the user is not focusing on the display location, then the eye vergence detection system causes an image to be hidden from the display.

At least one advantage of the techniques described herein is that a user is able to cause an image to be displayed or hidden based on whether the user is focusing his or her eyes on a display or the displayed image. Additionally, an image may be displayed via a transparent display and/or heads-up display (HUD), enabling the user to hide the image and then view the surrounding environment behind the image without changing his or her viewing direction.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of sensors that may acquire data associated with a display or the eyes of a user, persons skilled in the art will appreciate that the systems and techniques described herein are applicable to other types of sensors. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A method for displaying an image based on eye vergence, the method comprising:
   determining a first distance from one or more eyes of a user to a display location;
   computing, by a processor, eye gaze vectors associated with eyes of the user based on sensor data associated with the eyes of the user;
   determining, based on eye gaze vectors associated with the eyes of the user, an eye convergence distance;
   causing one or more images to be displayed while the eye convergence distance is substantially the same as the first distance; and
   causing at least a portion of the one or more images to be displayed only in part while the eye convergence distance is not substantially the same as the first distance.

2. The method of claim 1, wherein causing the display of the one or more images to be displayed only in part comprises causing the display of the one or more images to be displayed only in part while the eye convergence distance is substantially greater than the first distance.

3. The method of claim 1, wherein the one or more images are displayed on a transparent display, and causing the display of the one or more images to be displayed only in part comprises causing the display of the one or more images to be displayed only in part based on determining that the eyes of the user are focusing through the transparent display.

4. The method of claim 1, wherein computing the eye gaze vectors associated with the eyes of the user comprises computing a left eye gaze vector and a right eye gaze vector based on at least one corneal reflection image associated with the eyes of the user.

5. The method of claim 4, further comprising:
   determining a first location at which the left eye gaze vector intersects a plane associated with the display location; and
   determining a second location at which the right eye gaze vector intersects the plane associated with the display location.

6. The method of claim 5, wherein determining the eye convergence distance comprises determining the eye convergence distance based on a second distance between the first location at which the left eye gaze vector intersects the plane and the second location at which the right eye gaze vector intersects the plane.

7. The method of claim 1, wherein the display location corresponds to a display surface of a transparent display.

8. The method of claim 1, wherein the display location corresponds to a virtual image location generated by a heads-up display.

9. The method of claim 1, further comprising, when the eye convergence distance is not substantially the same as the first distance, causing a second image to remain displayed on a display at the display location.

10. The method of claim 1, wherein the eye convergence distance is substantially the same as the first distance when the eye convergence distance and the first distance differ by approximately 5 percent or less.

11. The method of claim 1, wherein the eye convergence distance is substantially the same as the first distance when the eye convergence distance and the first distance differ by approximately 10 percent or less.

12. The method of claim 1, wherein an icon resides at the display location, and wherein causing one or more images to be displayed when the eye convergence distance is substantially the same as the first distance comprises causing the icon to be displayed within a main portion of an in-vehicle display while the eye convergence distance is substantially the same as the first distance.

13. A system for displaying an image based on eye vergence, comprising:
   at least one sensor configured to acquire sensor data associated with eyes of a user;
   a processor coupled to the at least one sensor and configured to:
      compute, based on the sensor data, eye gaze vectors associated with the eyes of the user;
      determine, based on the eye gaze vectors, an eye convergence distance;
      determine a first distance from one or more of the eyes of the user to a display location;
      cause one or more images to be displayed by a display while the eye convergence distance is substantially the same as the first distance; and
      cause at least a portion of the one or more images to be displayed only in part by the display while the eye convergence distance is not substantially the same as the first distance; and
   the display coupled to the processor and configured to display the one or more images at the display location.

14. The system of claim 13, wherein the sensor data comprises at least one corneal reflection image associated with the eyes of the user, and the processor is configured to compute the eye gaze vectors associated with the eyes of the user by computing a left eye gaze vector and a right eye gaze vector based on the at least one corneal reflection image.

15. The system of claim 14, wherein the processor is configured to determine the eye convergence distance by:
   determining a first location at which the left eye gaze vector intersects a plane associated with the display location;
   determining a second location at which the right eye gaze vector intersects the plane associated with the display location;
   determining a second distance between the first location at which the left eye gaze vector intersects the plane and the second location at which the right eye gaze vector intersects the plane; and
   determining the eye convergence distance based on the second distance.

16. The system of claim 13, wherein the at least one sensor comprise a depth sensor configured to determine the first distance from the one or more of the eyes of the user to the display location.

17. The system of claim 13, wherein the display comprises a transparent display, and the processor is configured to cause at least a portion of the one or more images to be displayed only in part by the display while the eye convergence distance is substantially greater than the first distance.

18. The system of claim 17, wherein the transparent display comprises a primary display region and a secondary display region, and the display is configured to display the one or more images at the display location by displaying the one or more images in the primary display region.

19. The system of claim 18, wherein the processor is further configured to cause a second image to be displayed or remain displayed in the secondary display region while the eye convergence distance is not substantially the same as the first distance.

20. The system of claim 13, wherein the display comprises a heads-up display, and the display location corresponds to a volume within which the user perceives the one or more images.

21. The system of claim 13, wherein the display comprises a heads-up display, and the display location corresponds to a surface onto which the one or more images are projected by the heads-up display.

22. A non-transitory computer-readable storage medium including instructions that, when executed by a processor, cause the processor to display an image based on eye vergence, by performing the steps of:
   determining a first distance from one or more eyes of a user to a surface of a transparent display;
   computing, based on sensor data, eye gaze vectors associated with the eyes of the user;
   determining, based on the eye gaze vectors, an eye convergence distance;
   causing one or more images to be displayed while the eye convergence distance is substantially the same as the first distance; and
   causing at least a portion of the one or more images to be displayed only in part while the eye convergence distance is substantially greater than the first distance.

23. The non-transitory computer-readable storage medium of claim 22, wherein causing the display of the one or more images to be displayed only in part comprises causing the display of the one or more images to be displayed only in part based on determining that the eyes of the user are focusing through the transparent display.

24. The non-transitory computer-readable medium of claim 22, further comprising:
   displaying a plurality of icons as a part of the one or more images, each icon representing a different display mode;
   determining that the eye gaze vectors are converged on a first icon associated with a first display mode; and
   in response to determining that the eye gaze vectors are converged on the first icon, causing the one or more images to display information associated with the first display mode.

25. The non-transitory computer-readable medium of claim 22, wherein the one or more images include at least one icon.

26. The non-transitory computer-readable medium of claim 25, wherein the one or more images further include a graphical user interface, the at least one icon being displayed within a secondary display region of the graphical user interface.

\* \* \* \* \*